Jan. 3, 1933.   D. H. McGOGY   1,893,429
LIQUID METER
Filed Jan. 17, 1930   3 Sheets-Sheet 1

Inventor
D. H. McGogy
By Lacey & Lacey,
Attorneys

Jan. 3, 1933.  D. H. McGOGY  1,893,429
LIQUID METER
Filed Jan. 17, 1930   3 Sheets-Sheet 2

Inventor
D. H. McGogy
By Lacey & Lacey, Attorney

Jan. 3, 1933.  D. H. McGOGY  1,893,429
LIQUID METER
Filed Jan. 17, 1930  3 Sheets-Sheet 3
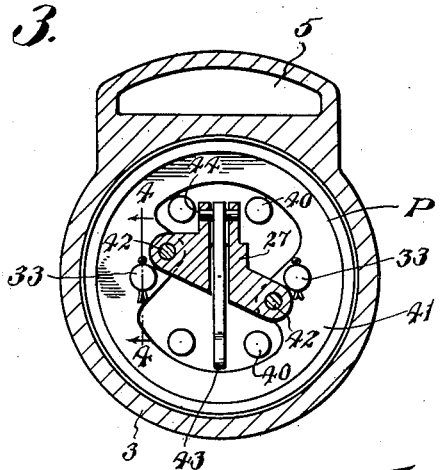
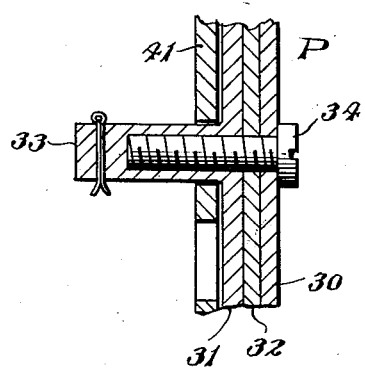
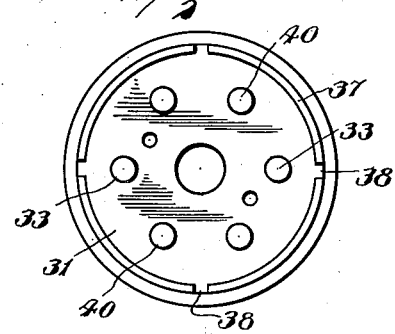
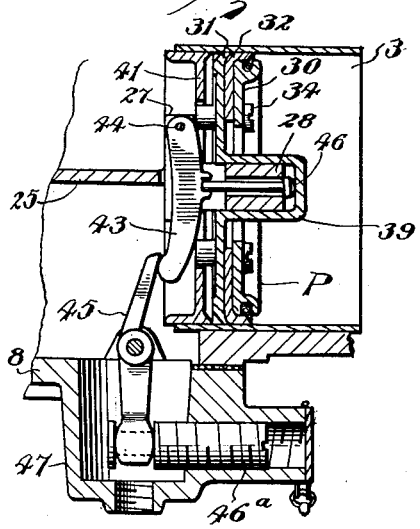
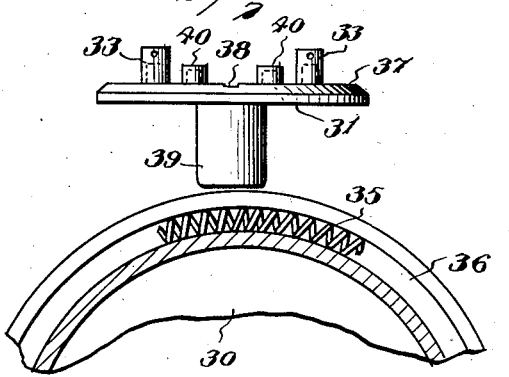
Inventor
D. H. McGogy
By Lacey & Lacey,
Attorneys Patented Jan. 3, 1933

1,893,429

UNITED STATES PATENT OFFICE

DONALD H. McGOGY, OF McMINNVILLE, OREGON

LIQUID METER

Application filed January 17, 1930. Serial No. 421,483.

The invention aims to devise a meter for accurately measuring fluids, such as petroleum, hydrocarbon and kindred liquid products, rapidly and without any appreciable diminution of flow when transferring the same from one container to another in the handling thereof.

Specifically considered, it is the purpose of the present invention to improve the form of meter for which Letters Patent of the United States were granted me December 11, 1928, No. 1,694,747, and July 14, 1931, No. 1,814,725.

The chief intent of the invention is to simplify the construction, reduce the number of parts, and facilitate the assembly. Also, to supply improved means coacting with the piston to cushion the arrest of its travel in one direction and to automatically compensate for volumetric variations due to changes in temperature.

For a full understanding of the invention and the merits thereof, reference is to be had to the following description and the drawings hereto attached, in which corresponding parts are designated by like reference characters in the several views.

In the drawings:

Figure 2 is a detail sectional view on the line 2—2 of Figure 1, looking in the direction indicated by the arrows.

Figure 3 is a transverse sectional view on the line 3—3 of Figure 2.

Figure 4 is an enlarged detail sectional view on the line 4—4 of Figure 3.

Figure 5 is an end view of the piston with which the check lever is associated.

Figure 6 is an edge view of the main piston member.

Figure 7 is a detail sectional view of the piston and adjunctive parts, showing the check lever and adjustable stop associated therewith.

Figure 8 is an enlarged sectional detail of a piston.

Figure 9 is a detail sectional view on the line 9—9 of Figure 2.

Figure 10 is a detail view of a check lever provided with a stop automatically adjustable by means of a thermostat.

Figure 11 is a detail section on the line 11—11 of Figure 10.

Figure 1:
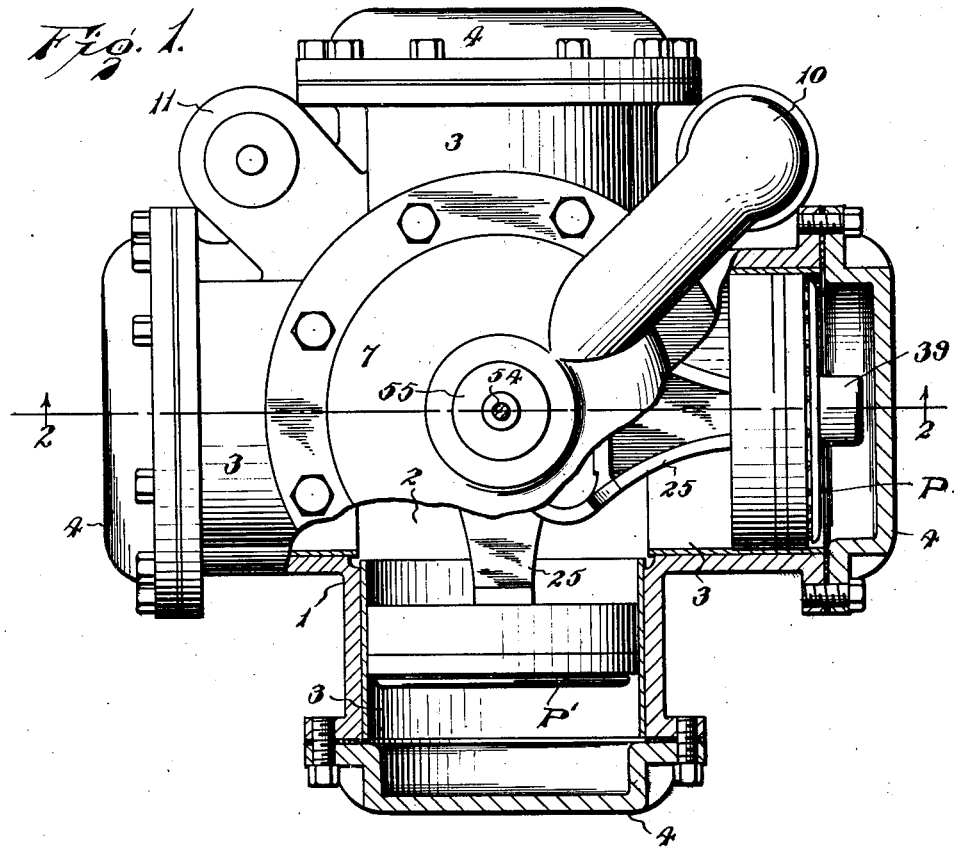
Figure 1 is a top plan view of an embodiment of the invention, parts being broken away to disclose the arrangement of the pistons.

The body of the meter is designated generally by the numeral 1 and encloses a chamber 2 from which radiate cylinders 3 which are closed at their outer ends by caps 4 bolted or otherwise secured thereto. In the preferable construction, the cylinders 3 are lined. Passages 5 are formed in the body and are in communication with the outer ends of the cylinders. The inner ends of the passages 5 extend through a valve seat 6 forming a part of the body 1, said seat being slightly raised, as indicated most clearly in Figure 2 of the drawings. The chamber 2 formed within the body 1 is closed at its top by means of a cap plate 7 and at its bottom by means of a plate 8, said plates being held in place by bolts or other determinate fastening means. The cap plate 7 is formed upon its inner or lower face with a rib 9 adapted to encircle the raised seat 6. The inlet for the liquid is designated by the numeral 10 and the outlet by the numeral 11. The rotary valve is indicated at 12 and is mounted upon the seat 6 and controls the inflow and outflow of the liquid passing through the meter. A tubular stem 13 mounted within an inner boss 14 is associated with the valve 12 and rotates therewith. Pins 15 form connecting means between the valve 12 and stem 13 and are set into openings formed in the valve and enter notches 16 provided in the upper end of the stem 13. This arrangement simplifies the construction and enables ready assemblage of the parts. An inner shoulder 17 is formed at the upper end of the boss 14 and an outer shoulder 18 is formed at the inner or lower end of the stem 13. These shoulders 17 and 18 coact with a collar 19, secured on the stem 13, to retain said stem in place and hold anti-friction bearings 20 in position within the boss 14 and between it and the stem 13. A ring 21 is secured to the lower end of the boss 14 and engages under the lower anti-friction bearings 20 and assists materially, in conjunction with the collar 19, to retain the stem 13 in place. A crank arm 22, forming a part of the stem 13, has a crank pin 23 fitted thereto. The crank pin 23 extends through slots 24 formed in connecting rods 25 and receives rollers 126 which reduce the friction between the crank pin and connecting rods to the smallest amount possible.

The cylinders 3 are provided in pairs and each receives a piston. The cylinders of each pair are opposed and the pistons therein are connected for simultaneous movement by means of one of the rods 25. In the construction disclosed, the meter embodies four cylinders and a like number of pistons. If only one cylinder is to be outfitted with an adjusting piston, three of the ends of the rods 25 are formed with an internally threaded socket 26 while the remaining connecting rod end is fitted with a cross head 27 and a short tubular extension 28 to accommodate the adjusting piston. Each of the fixed pistons is secured to the connecting rod 25 by means of a bolt 29 passing therethrough and engaging the socket 26. The adjusting piston at the opposite end of the connecting rod 25 has a limited sliding movement on the extension 28, whereby provision is had for checking the inward movement of said piston while the rod and opposite piston continue to move. The loose piston is designated generally by the reference letter P whereas the fixed piston is indicated by the reference letter P'. Corresponding components of the two sets of pistons are designated by like reference numerals, thereby enabling a clear understanding of the construction to be had from a detailed description of one. Each piston includes an outer member 30, an inner member 31, and a cup washer 32 clamped between the two members. The inner member 31 is formed with lateral studs 33 which project inwardly and receive clamp screws 34. The outer portion of the washer 32 overlaps the outer edge of the member 30 and is pressed outwardly by means of a coil spring 35 fitted in a lateral flange 36 at the side of the member 30 and channeled to receive the spring. The inner member 31 is formed adjacent its peripheral edge with a lateral bead or rib 37 of circular outline which is cut away at intervals, as indicated at 38, to provide passageways for pressure to prevent the formation of a vacuum, as explained more fully hereafter.

The inner member 31 of the loose piston is formed with an outwardly disposed hollow projection 39 having an axial arrangement and disposed to fit loosely upon the extension 28 and project through central openings in the washer 32 and the piston member 30. Studs 40 project laterally from the inner member 31 and are similar to the studs 33 and are internally threaded to receive bolts or fastenings similar to the bolts 34 and for a like purpose, namely, to clamp the cup washer 32 between the members 30 and 31. A member 41 is associated with the loose piston and is secured to the cross head 27 of the connecting rod by means of bolts 42. The member 41 has a piston fit within the cylinder and its middle portion is cut away, as indicated most clearly in Figure 3 of the drawings, to provide clearance for the studs 40, portions remaining intact and having openings therein to receive the studs 33 which prevent turning of the piston in the cylinder. Cotter pins fitted in the ends of the studs 33 prevent the member 41 moving off the studs. A check lever 43 passes loosely through an opening formed in an end portion of the connecting rod 25 and is pivoted at one end to the cross head 27, as indicated at 44. The cross head 27 is slotted to accommodate the lever 43, as indicated most clearly in Figure 3 of the drawings. The free end of the check lever 43 extends within the path of the upper end of a trip lever 45 which is pivoted intermediate its ends to the lower part of the body or cap 8. A pin 46 mounted loosely in the bore of the extension 28 of the connecting rod engages the check lever 43 at its inner end and its outer end is adapted to engage the closed end of the tubular projection 39. The trip lever 45 constitutes an adjustable stop and is adapted to be set by means of a screw 46a threaded into a boss projecting laterally from a tubular projection 47 depending from the lower plate 8. The arrangement admits of manual adjustment of the trip lever or stop 45.

Provision is had for automatic adjustment of the stop incident to changes in temperature of the fluid passing through the meter. One form of automatic adjustment is illustrated in Figure 10 of the drawings and includes a thermostat 48 which is of loop formation and is secured at one end to the check trip 45, as indicated at 49, the opposite end being in engagement with an abutment 50 slidable on a longitudinally inclined arm of the lever 45. The abutment 50 is of wedge formation and is provided with a lug 51 passing through a slot 52 formed in the inclined arm of the lever 45 and receiving a pin 53 which retains the abutment in place. The end of the thermostat 48 enters a notch formed in the lug 51. As the temperature of the liquid flowing through the meter changes, the thermostat 48 is correspondingly affected and moves the abutment 50, thereby changing its point of contact with the check lever 43, whereby its contact with the check lever is advanced or retarded to engage the check lever earlier or later in the travel of the piston to arrest its movement and thereby compensate for any variations in the volume of the liquid flowing through the meter due to change of temperature.

To keep tally on the amount of liquid flowing through the meter, it is proposed to employ a suitable registering mechanism (not shown) and the same is actuated by operating means substantially as indicated in Figure 2 of the drawings and including a shaft 54 mounted in an extension 55 of the plate 7. A crank 56 at the inner or lower end of the shaft 54 engages a projecting end of one of the pins 15, hence rotation of the valve 12 imparts a corresponding movement to the shaft 54 whereby the registering mechanism is driven when the meter is in action.

The operation of the meter is substantially the same as disclosed in my patents hereinbefore identified and, briefly stated, is as follows:

The liquid entering the meter at 10, flows through valve 12 and a passage 5 to the outer end of a cylinder 3 and exerts a pressure upon the piston within said cylinder. By way of illustration, reference being had to Figure 2 of the drawings, the inflowing liquid acts upon the loose piston P and forces it inward and the corresponding opposed piston P' is moved outwardly in its cylinder and expels the liquid from said cylinder, it being assumed that all the cylinders, passages, and chamber of the meter have been previously filled. The displaced liquid flows through the opposed passages into the chamber of the valve 12, thence through the stem 13, chamber 2, and outlet 11. The valve 12 is rotated by reason of its connection with the rods 25, thereby successively admitting the inflowing liquid to the cylinders and correspondingly providing for a discharge of the liquid through the outlet 11. As the piston P reaches the limit of its inward travel, the check lever 43 engages the trip or stop lever 45, which results in a turning of the check lever 43 about its pivot connection 44 with the connecting rod and a pushing of the pin 46 outward within the hollow projection 39 and abutting the outer closed end thereof. As a result, the inward travel of the piston P is checked while the connecting rod may continue its travel to the end of its stroke, the piston P coming to a full stop when the check lever 43 reaches the limit of its rocking movement. In this manner, sudden stoppage of the piston is prevented and provision had for adjusting the meter for accuracy of operation. When the meter includes a thermostatic adjustment, compensation is had for variations in volume of the liquid flowing through the meter due to changes in temperature, as will be readily comprehended.

It should be stated that the provision of one adjusting piston is merely a question as to whether one will allow for sufficient variation in the dsplacement of a meter to meet the needs of that particular meter. Obviously, four adjusting pistons would allow four times the volumetric correction or change that only one adjusting piston would give, assuming the same allowable variation in piston control in both cases. Therefore, if one adjusting piston will supply as much correction as is needed in a certain type of meter, there is no reason for having the correction or adjustment in more than one cylinder. The number of pistons used adjustably does not affect the accuracy of a meter between the total amount of volumetric variation permissible or obtainable in said meter.

It will be understood that the crosshead 27 and the member 41 secured thereto must move with the piston rod and through the full stroke of the crank. Were the members 31 and 41 in contact throughout the entire area of their opposed faces, the pressure of liquid upon the member 31 would tend to hold the members together. The rib 37 reduces the area of contact but there is a tendency to form a vacuum which resists the separation of the members. The function of the cut away intervals 38 is to break up the vacuum or suction which appears when check lever 43 strikes lever 45 and retards piston P. Liquid at the inner side of the piston may flow through the open space around the cross head and the spaces 38 permit flow between the edges of the members 31 and 41 to eliminate sticking due to vacuum or suction.

The valve 12 under normal working conditions of the meter is held seated by its weight and the pressure of the liquid thereon. When the flow through the meter is suddenly checked and tends to create a back pressure, the valve 12 is forced from its seat and the shock relieved, thereby preventing injury to the working parts or interference with the usual operation of the meter.

What is claimed is:

1. In a liquid meter of the character specified, and in combination with a casing including a cylinder and a piston therein, a connecting rod associated with the piston and having a limited movement independently thereof, a check lever pivoted to and movable with the connecting rod, connecting means between the check lever and piston, and a stop in the path of the check lever to rock the same and check the inward travel of the piston without affecting the continued movement of the connecting rod.

2. In a liquid meter of the character specified, and in combination with a casing including a cylinder and a piston therein, a connecting rod associated with the piston and having a limited movement independently thereof, a check lever pivoted to and movable with the connecting rod, connecting means between the check lever and piston, a stop in the path of the check lever to engage and rock the same and check the inward travel of the piston without affecting the continued movement of the connecting rod, and means for adjusting said stop to vary its time of contact with the check lever relative to the position of the piston in its travel.

3. In a liquid meter of the character specified, and in combination with a casing including a cylinder and a piston therein, a connecting rod associated with the piston and having a limited independent movement, a check lever pivoted at one end to the connecting rod, connecting means between the piston and check lever and engaging the latter intermediate its ends, and a stop in the path of the free end of the check lever to engage and rock the same and thereby check the travel of the piston in one direction.

4. In a liquid meter of the character specified comprising a casing including a cylinder, a piston in the cylinder provided with an outwardly disposed hollow projection, a connecting rod loosely engaging the projection of the piston, a pin slidably mounted axially of the connecting rod and in engagement with the hollow projection of the piston, a check lever pivoted to the connecting rod and engageable with the inner end of said pin, and a stop in the path of said check lever to rock the same and check the inward movement of the piston through the instrumentality of the said pin.

5. In a liquid meter of the character specified, a cylinder, a piston therein having a hollow projection, a connecting rod loosely engaging the hollow projection of the piston, a pin axially and slidably mounted within the connecting rod and in contact at its outer end with the closed end of said hollow projection, a check lever pivoted to the connecting rod and engaging the inner end of said pin, and a stop in the path of the check lever to engage and rock the same to check the inward movement of the piston.

6. In combination, a cylinder, a piston therein having an outwardly disposed hollow projection, a connecting rod having an opening and provided with an extension loosely engaging the hollow projection of the piston, a pin slidably mounted in the extension of the connecting rod and engaging the projection of the piston, a check lever disposed in the opening of the connecting rod and pivoted at one end to the latter and in engagement with the pin, and a stop in the path of the free end of the check lever.

7. In combination, a cylinder, a piston therein, a connecting rod associated with the piston and having a limited independent movement, a check lever movable with the piston and connecting rod and pivoted to one of said parts, a trip lever pivoted between its ends and disposed in the path of the check lever, and means for adjusting the trip lever to vary the time of its contact with the check lever relative to a determinate point in the travel of the piston.

8. In a liquid meter, the combination of opposed cylinders, pistons in the cylinders, connecting rods having the pistons mounted thereon in pairs, one of the pistons being loosely connected to one of the connecting rods, a check lever mounted upon the connecting rod associated with the loose piston, means to connect said lever with the loose piston, and a stop in the path of the check lever to engage and rock the latter to check the movement of the loose piston without affecting the continued movement of the companion piston.

9. In combination, a cylinder, a member having a piston fit therein, a piston within the cylinder, and a connecting rod loosely receiving the piston and having the member rigidly connected thereto, there being a lateral rib of circular outline between opposing faces of the member and piston adjacent the periphery thereof and having portions cut away at intervals to provide passages.

10. In combination, a connecting rod having a terminal extension and a cross head adjacent said extension, a member on the end of the connecting rod and secured to said cross head, a piston loose on the terminal extension of the connecting rod, guide means between the piston and said member to prevent relative turning of the piston and the member, a check lever carried by the connecting rod and pivoted thereto, a stop in the path of the check lever, and connecting means between the check lever and piston whereby to transmit force from said check lever to the piston and check movement of the piston when the check lever comes in contact with said stop.

11. In a liquid meter of the character specified, a casing, coacting pistons and cylinders, a rotary valve, an independent tubular stem, loose connections between the valve and the stem whereby the valve may move endwise of the stem without being released therefrom, and means whereby movement of the pistons will effect rotation of the stem.

12. In a liquid meter, a casing having an inner tubular boss, coacting pistons and cylinders, a tubular stem mounted in said boss, means whereby movement of the pistons will effect rotation of the stem, an independent rotary valve, and loose connections between the valve and the stem whereby the valve will rotate with the stem and may move endwise thereof.

13. In a liquid meter of the character specified, automatic means for checking the movement of a piston at the limit of its movement in one direction comprising a trip lever having a longitudinally inclined slotted arm, an abutment slidable on the inclined arm of the lever and provided with a lug passing through the slot therein, a thermostat of loop formation having one end fast to the lever and its opposite end in engagement with the lug of the abutment, a connecting rod driven by the piston, and a check lever pivoted on the connecting rod and connected with the piston and carried into engagement with the trip lever by movement of the piston.

14. In a liquid meter comprising a casing and coacting pistons and cylinders, a rotary valve, a stem having notches in its upper end, pins secured to the valve and resting in the notches in the stem, and means whereby movement of the piston will effect rotation of the stem.

In testimony whereof I affix my signature.

DONALD H. McGOGY. [L. S.]